United States Patent [19]

Takeda et al.

[11] Patent Number: 5,122,870
[45] Date of Patent: Jun. 16, 1992

[54] THREE-LCD PROJECTOR HAVING SPECIFIED SCANNING DIRECTIONS

[75] Inventors: Mamoru Takeda, Hirakata; Yoshito Miyatake, Neyagawa, both of Japan

[73] Assignee: Matsushita Electric Industrial Co., Ltd., Osaka, Japan

[21] Appl. No.: 615,857

[22] Filed: Nov. 20, 1990

[30] Foreign Application Priority Data

Nov. 20, 1989 [JP] Japan .................. 1-301702

[51] Int. Cl.⁵ ............................... H04N 9/31
[52] U.S. Cl. ...................................... 358/60
[58] Field of Search .................. 358/60, 231, 236, 180

[56] References Cited

U.S. PATENT DOCUMENTS 4,943,154 7/1990 Miyatake et al. ................ 358/60 X

FOREIGN PATENT DOCUMENTS 63-158591 7/1988 Japan .
63-240525 10/1988 Japan .

Primary Examiner—James J. Groody
Assistant Examiner—Mark R. Powell
Attorney, Agent, or Firm—Wenderoth, Lind & Ponack

[57] ABSTRACT

A projection type liquid crystal color display apparatus has three liquid crystal display panels which are the same in structure. Two of the three liquid crystal display panels are controlled so that signal lines are scanned from right to left and scanning lines are scanned from top to bottom. The third liquid crystal display panel is controlled so that signal lines are scanned from right to left and scanning lines are scanned from bottom to top. Each of the three liquid crystal display panels may be connected at the same side thereof to a flexible board provided for the supply of an input signal to a driver IC for driving the liquid crystal display panel.

2 Claims, 3 Drawing Sheets

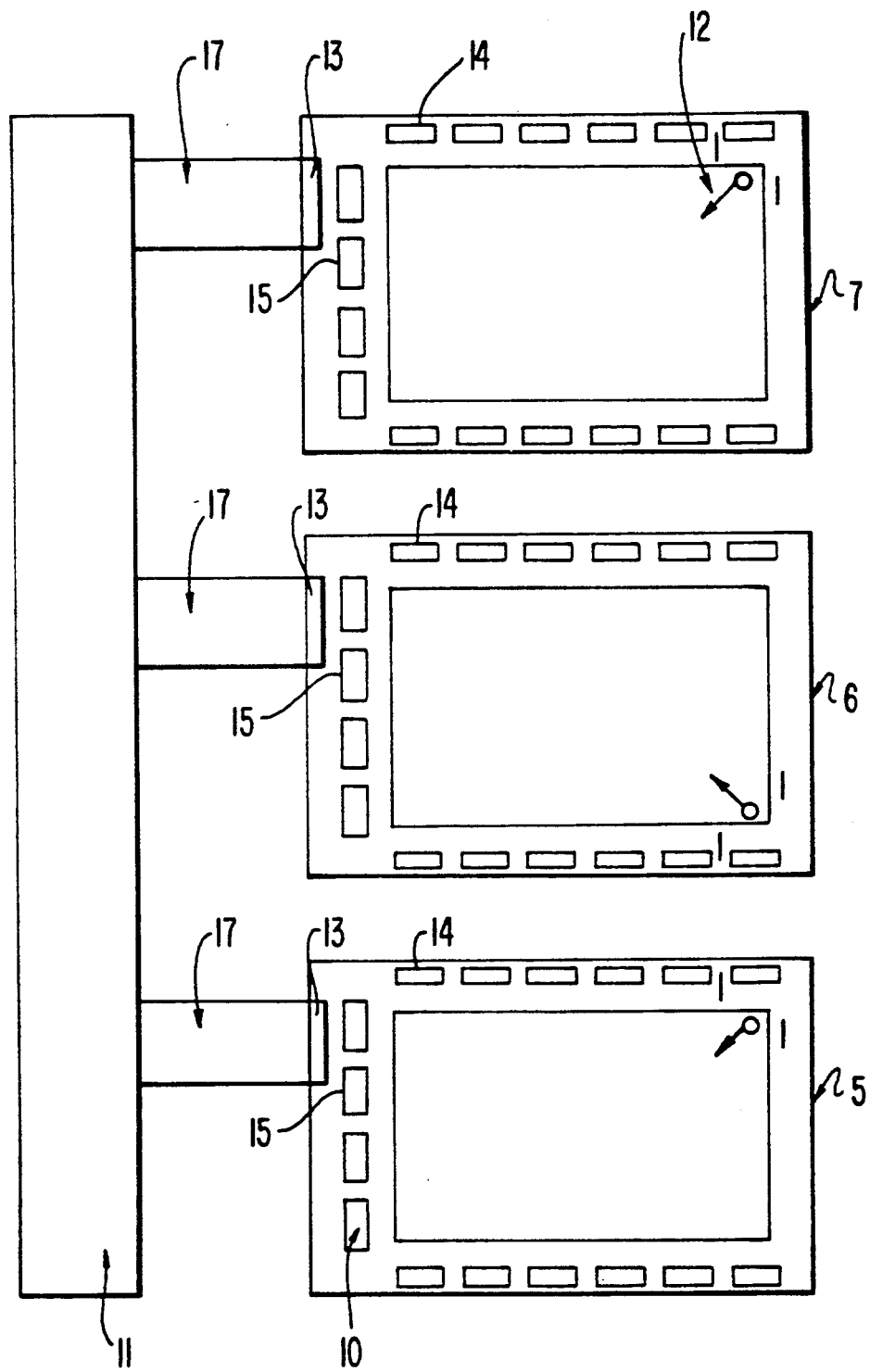

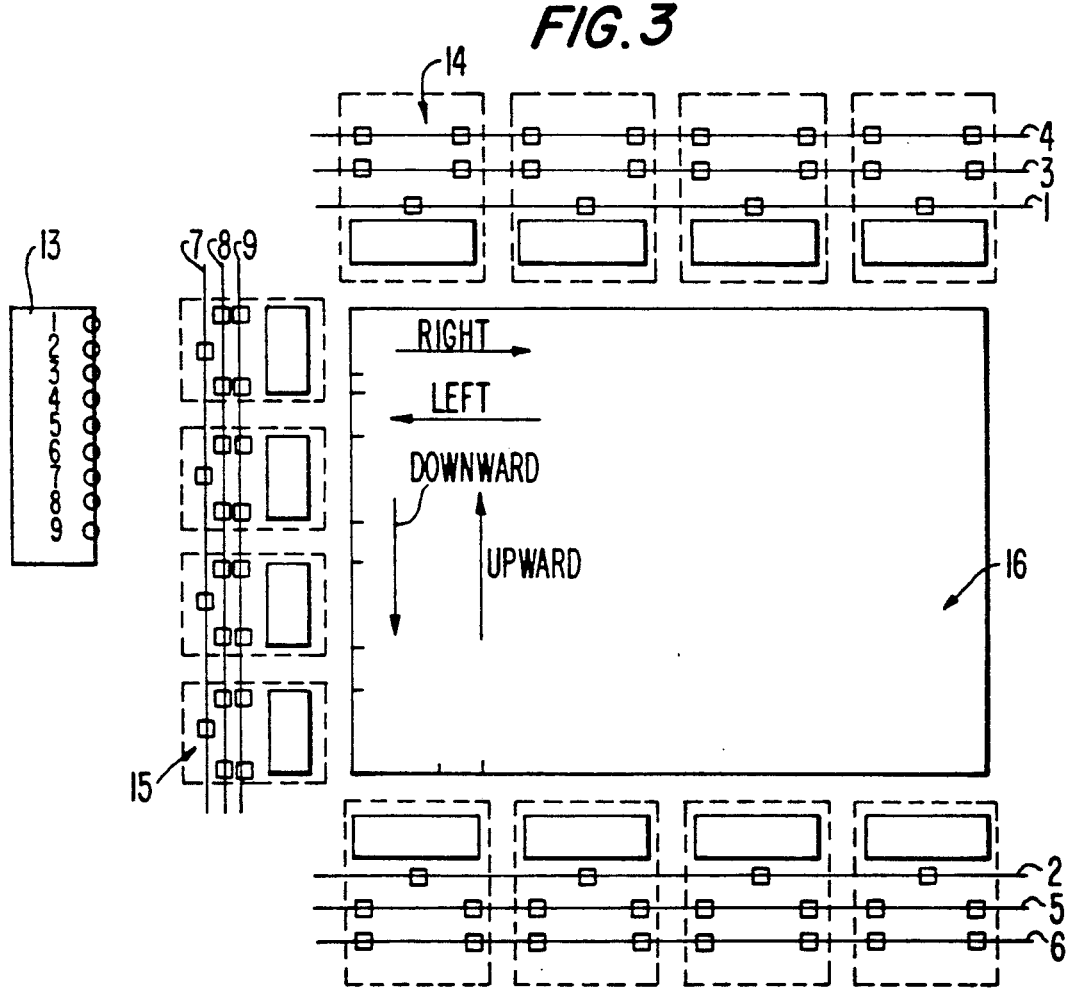

THREE-LCD PROJECTOR HAVING SPECIFIED SCANNING DIRECTIONS

BACKGROUND OF THE INVENTION

1. Field of the Invention

The present invention relates to a projection type liquid crystal color display apparatus provided with three active liquid crystal display panels of red (R), green (G), and blue (B) for projection display.

2. Description of the Prior Art

A prior art projection type liquid crystal color display apparatus has three liquid crystal display panels designated in such a positional arrangement that scanning lines are scanned from top to bottom of each panel and signal line are scanned from left to right, as viewed from the front.

If the liquid crystal display panels are installed upside down and backwards in a product apparatus, a produced image appears upside down and backwards corresponding to the inverted arrangement of pixels. This designates the product as being defective. Also, since the scanning is effected in the same direction on the three liquid crystal display panels which are assembled in combination for projection of one single color image, at least one of three outputs from their respective three flexible printed circuit boards provided for supply of input signals to a driver IC (integrated circuit) has to be fed from the opposite end. As the result, a communication distance between the opposite end output and the driver IC becomes longer causing an attenuation in the voltage of the input signal. It is then necessary to provide an amplifier device in order to compensate for the voltage attenuation.

SUMMARY OF THE INVENTION

An object of the present invention is to provide a projection type liquid crystal color display apparatus having three display panels capable of providing a normal display of images even if installed upside down and backwards also capable of being actuated for proper display with no extra intermediate amplifier.

For eliminating the foregoing drawbacks, the projection type liquid crystal color display apparatus according to the present invention incorporates a specific pattern of wiring arranged on an array board of each liquid crystal display panel so that signal lines can be scanned in a normal direction and also, in the reverse direction and has driver ICs provided about the liquid crystal display panel for a similar purpose.

Accordingly, the present invention allows the direction of display to be turned upside down and backwards. Even if one the liquid crystal display panels is installed upside down and backwards, a normal display of image can be effected by the control of the input signals to the driver ICs.

BRIEF DESCRIPTION OF THE DRAWINGS

FIG. 2 is a view illustrating the arrangement of three liquid crystal display panels; and FIG. 3 is a view showing the connection in array form between driver ICs associated with scanning and signal lines and an input section mounted on the liquid crystal display panel.

DESCRIPTION OF THE PREFERRED EMBODIMENT

Figure 1:
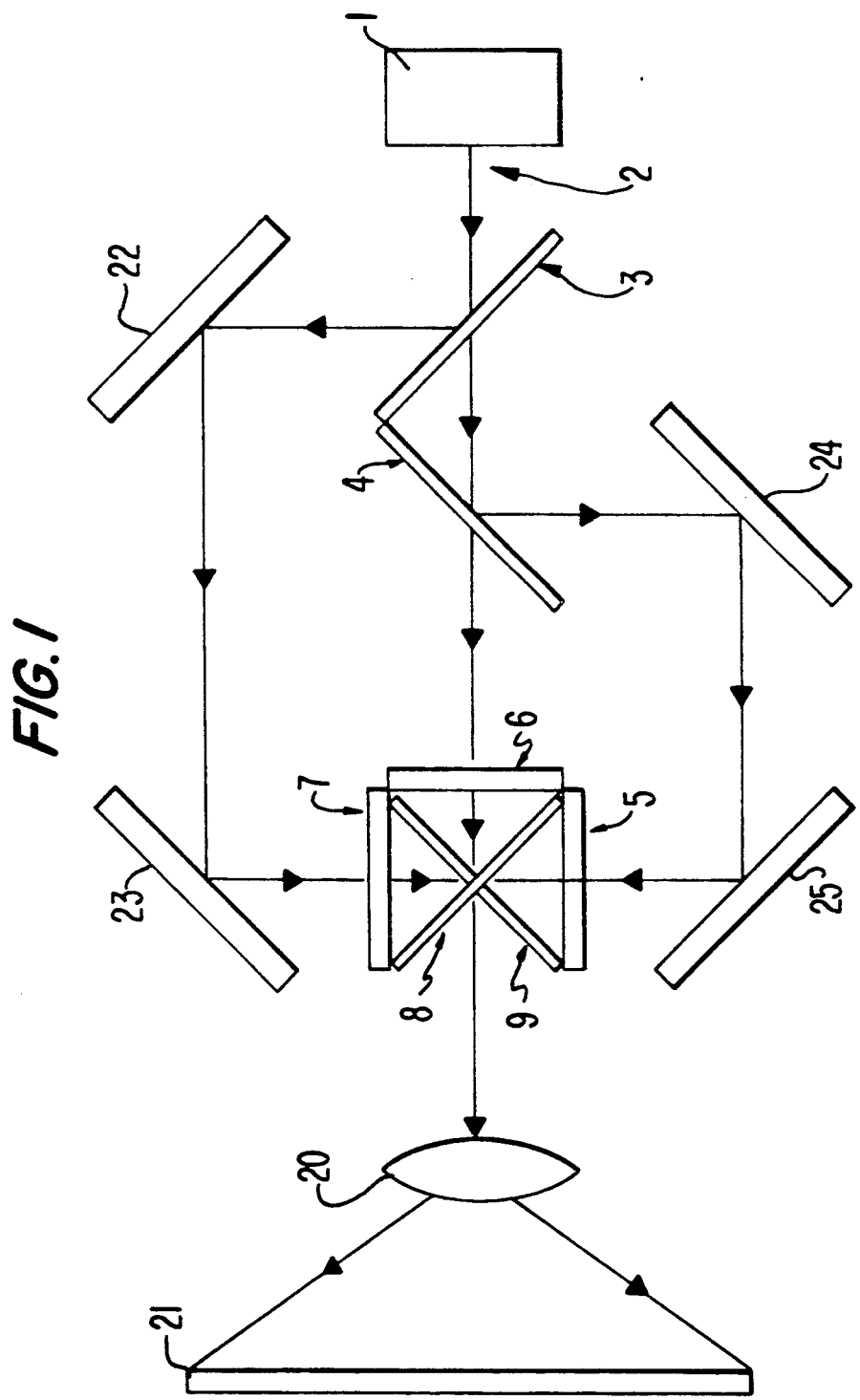
FIG. 1 is a schematic view of a projection type liquid crystal color display apparatus showing one preferred embodiment of the present invention.

FIG. 1 is a schematic view of a projection type liquid crystal color display apparatus showing one preferred embodiment of the present invention.

There are provided red, green, and blue color liquid crystal display panels 5, 6. and 7 for development of three respective red, green, and blue color images which are in turn combined using dichroic mirrors. Each liquid crystal display panel has a liquid crystal layer interposed between two substrates. One of the two substrates has at the upper surface a matrix of pixel electrodes and a TFT (thin film transistor) serving as a switching element for driving the pixel electrodes. The other substrate has an opposed common electrode arranged thereon. Also, a pair of polarizers are provided on both sides of the liquid crystal display panel. In operation, beams of light 2 emitted from a light source 1 are separated by a pair of blue and red dichroic mirrors 3 and 4 into red, green, and blue beams which are in turn transmitted to the red, green, and blue color liquid crystal display panels 5, 6, and 7. The three light beams are then combined through dichroic mirrors 8 and 9. Reflective mirrors 22, 23, 24, and 25 are also provided. The combined light from the dichroic mirrors 8 and 9 is projected onto a screen 21 through a projection lens 20, reproducing a color image. At the time, the liquid crystal display panels are actuated as shown in FIG. 2. The three liquid crystal display panels are the same in the arrangement of driver ICs and a connection between the driver ICs and the switching element. The scanning starts from upper right at the red panel 5, lower right at the green panel 6, and upper right at the blue panel 7, and are all controlled by a driver control circuit 11. More particularly, the direction of scanning is varied with the three panels arranged in the same direction, in which the scanning of the scanning lines is effected from top to bottom at the red and blue panels 5 and 7 and from bottom to top across the green panel 6 while the scanning of signal lines is from right to left. Also, a flexible board 17 for supply of an input signal to the driver IC 10 is mounted on the same side of each liquid crystal display panel. FIG. 3 illustrates the connection of a signal input section 13 of the flexible board 17 to both an image signal driver IC (integrated circuit) 14 and a scanning line driver IC 15 of the liquid crystal display panel, in which terminals 1 to 9 of the signal input section 13 are communicated to corresponding terminals 1 to 9 of the driver ICs 14 and 15 by an array of connecting lines or an auxiliary printed circuit board. Such input signals are shown in Table 1, where they are applied to the terminals 1, 2, and 7, can be fed through the connection arrangement. In the operation of normal mode, gate scanning in the red and blue color liquid crystal display panels 5 and 7 is effected from top to bottom and image single scanning is executed from right to left. In the green color liquid crystal display panel 6, the gate scanning is however effected in the reverse direction, from bottom to top while the image signal scanning is carried out from left to right.

As apparent from the description of the preferred embodiment of the present invention, the distance from the signal source to each flexible board provided for supply of a signal to the corresponding liquid crystal display panel is almost equal and shortened. Accordingly, the amplification of the signal in the flexible board is unnecessary and thus, the entire apparatus arrangement is simplified.

TABLE 1

| DISPLAY PANEL | R AND B DISPLAY | | G DISPLAY | |
|---|---|---|---|---|
| MODE<br>SIGNAL LINE SCANNING<br>X-SCANNING | NORMAL<br>LEFTWARD<br>DOWNWARD | REVERSE<br>RIGHTWARD<br>UPWARD | NORMAL<br>LEFTWARD<br>UPWARD | REVERSE<br>RIGHTWARD<br>DOWNWARD |
| TERMINALS ① Y | L | H | L | H |
| ② | H | L | H | L |
| ③ | USED | NOT USED | USED | NOT USED |
| ④ | NOT USED | USED | NOT USED | USED |
| ⑤ | USED | NOT USED | USED | NOT USED |
| ⑥ | NOT USED | USED | NOT USED | USED |
| ⑦ X | L | H | H | L |
| ⑧ | NOT USED | USED | USED | NOT USED |
| ⑨ | USED | NOT USED | NOT USED | USED |

What is claimed is:

1. A projection type liquid crystal color display apparatus comprising: three liquid crystal display panels which the are the same in the structure; a means for controlling two of the three liquid crystal display panels so that signal lines are scanned from right to left and scanning lines are scanned from top to bottom; and a means for controlling the third liquid crystal display panel so that signal lines are scanned from right to left and scanning lines are scanned from bottom to top.

2. An apparatus according to claim 1, wherein each of the three liquid crystal display panels is connected at the same side thereof to a flexible board provided for supply of an input signal to a driver IC for driving the liquid crystal display panel.

* * * * *